(12) United States Patent
Kim (10) Patent No.: US 11,099,084 B2
(45) Date of Patent: Aug. 24, 2021

(54) PRESSURE SENSOR (71) Applicant: ELECTRONICS AND TELECOMMUNICATIONS RESEARCH INSTITUTE, Daejeon (KR)

(72) Inventor: Jin Tae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/585,663

(22) Filed: Sep. 27, 2019

(65) Prior Publication Data
US 2020/0025635 A1 Jan. 23, 2020

(30) Foreign Application Priority Data

Oct. 5, 2018 (KR) .................. 10-2018-0119355
Feb. 18, 2019 (KR) .................. 10-2019-0018851

(51) Int. Cl.
  G01L 1/24 (2006.01)
  G01D 5/34 (2006.01)
(52) U.S. Cl.
  CPC . G01L 1/24 (2013.01); G01D 5/34 (2013.01)
(58) Field of Classification Search
  None
  See application file for complete search history.

(56) References Cited

U.S. PATENT DOCUMENTS

| 9,291,836 | B2 | 3/2016 | Kim et al. |
| 9,323,392 | B2 | 4/2016 | Kyung et al. |
| 2012/0318074 | A1 | 12/2012 | Kyung et al. |
| 2013/0026442 | A1* | 1/2013 | Kim ............ H01L 31/028 257/9 |
| 2014/0103213 | A1* | 4/2014 | Maliakal ........... G02B 6/122 250/343 |
| 2014/0111480 | A1 | 4/2014 | Kim et al. |
| 2016/0380121 | A1* | 12/2016 | Suzuki ............. G02F 1/025 385/2 |
| 2019/0219445 | A1* | 7/2019 | Madi ............... G01J 3/4531 |

FOREIGN PATENT DOCUMENTS

| JP | 6413223 B2 | 10/2018 |
| KR | 20100054891 A | 5/2010 |
| KR | 20140135014 A | 11/2014 |

OTHER PUBLICATIONS

Cheon, et al., "Plastic optical touch panels for large-scale flexible display," Optics Express, Feb. 2013, vol. 21. No. 4, pp. 4734-4739.
Rothmeier, et al., "Textile Pressure Sensor Made of Flexible Plastic Optical Fibers," Sensors, 2008, 8, pp. 4318-4329.

* cited by examiner

Primary Examiner — Chad H Smith (57) ABSTRACT

Provided is a pressure sensor including a first optical waveguide inside a lower substrate, a graphene layer above the lower substrate, an upper substrate above the graphene layer, and spacers between the lower substrate and the upper substrate.

14 Claims, 13 Drawing Sheets

TRAVELLING DIRECTION OF LIGHT

PRESSURE SENSOR

CROSS-REFERENCE TO RELATED APPLICATIONS

This U.S. non-provisional patent application claims priority under 35 U.S.C. § 119 of Korean Patent Application Nos. 10-2018-0119355, filed on Oct. 5, 2018, and 10-2019-0018851, filed on Feb. 18, 2019, the entire contents of which are hereby incorporated by reference.

BACKGROUND

The present disclosure herein relates to a pressure sensor, and more particularly, to an optical type pressure.

A pressure sensor has mainly utilized electrical characteristics of a material such as a piezoelectric effect, but when using an optical waveguide, the pressure sensor has advantages of operating irrespective of electromagnetic waves generated in a nearby environment and not causing a property change generated in an electronic element even though operating for a long period of time.

The pressure sensor using the optical waveguide measures a pressure through a change in an optical signal that flows in the optical waveguide. When a pressure is applied on an upper substrate of the pressure sensor, a portion of the optical signal flowing in the optical waveguide is discharged through the upper substrate, and thus the intensity of the optical signal discharged from a light discharge port of the optical waveguide is lower than the intensity of the optical signal incident to a light incident port of the optical waveguide. Accordingly, a change in the intensity of the optical signal between the light discharge port of the optical waveguide and the light incident port of the optical waveguide is measured.

However, in order to discharge the portion of the optical signal through the upper substrate, the refractive index of the upper substrate should be higher than the refractive index of the optical waveguide. Consequently, the upper substrate should be made of a material having a higher refractive index than the optical waveguide.

SUMMARY

The present disclosure provides a pressure sensor including an upper substrate of which a material is not limited.

The purpose of the present disclosure is not limited to the aforesaid, but other purposes not described herein will be clearly understood by those skilled in the art from descriptions below.

An embodiment of the inventive concept provides a pressure sensor including: a first optical waveguide inside a lower substrate; a graphene layer above the lower substrate; an upper substrate above the graphene layer; and spacers between the lower substrate and the upper substrate.

In an embodiment of the inventive concept, a pressure sensor includes: a lower substrate including an optical waveguide; an upper substrate above the lower substrate; and a graphene layer between the lower substrate and the upper substrate, wherein the upper substrate includes: an upper portion; and a first lower portion and second lower portions that protrude from a bottom surface of the upper portion, and the first lower portion is disposed between the second lower portions.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
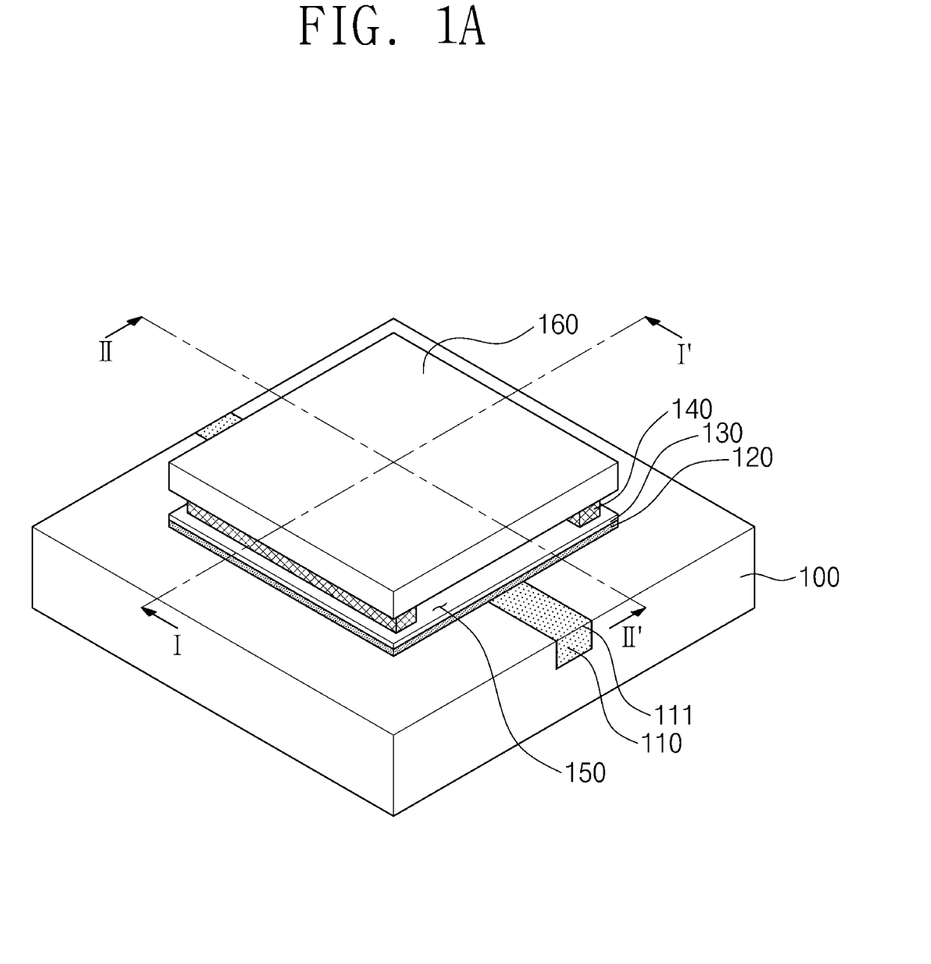
FIG. 1A is a perspective view of a pressure sensor according to an embodiment of the inventive concept.
Figure 1B:
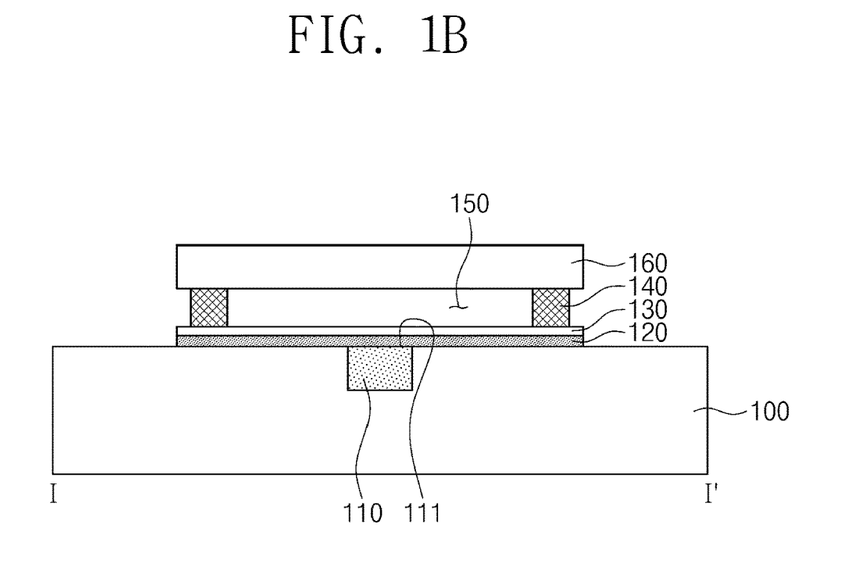
FIG. 1B is a cross-sectional view taken along line I-I' of FIG. 1A for the pressure sensor according to the embodiment of the inventive concept.
Figure 1C:
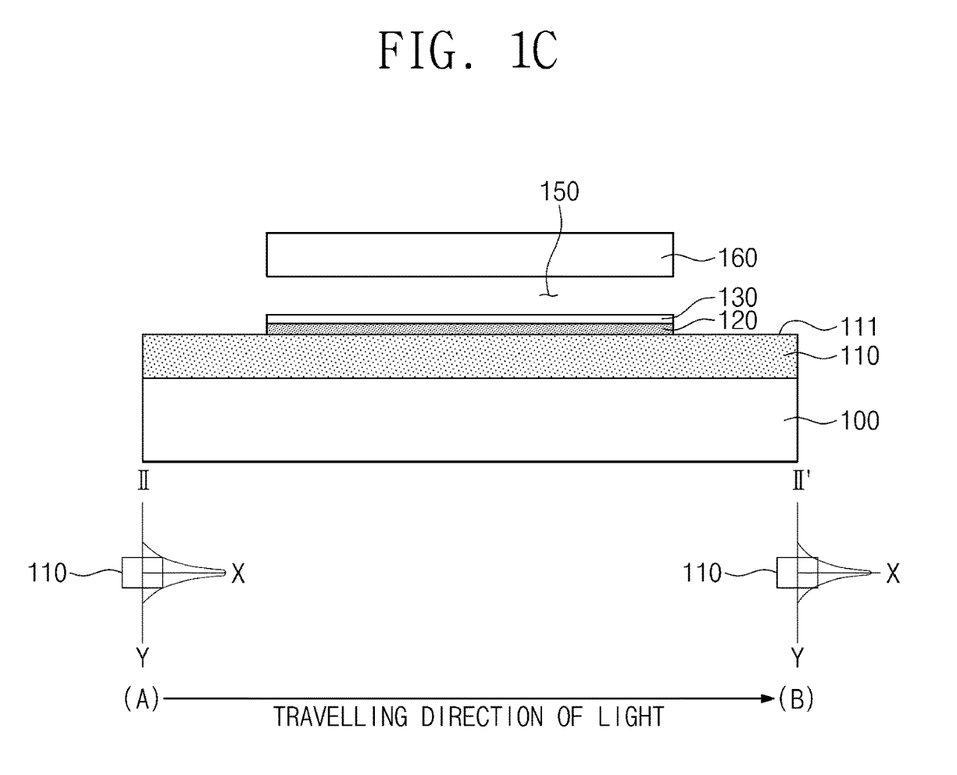
FIG. 1C is a cross-sectional view taken along line II-II' of FIG. 1A for the pressure sensor according to the embodiment of the inventive concept.

FIG. 1A is a perspective view of a pressure sensor according to an embodiment of the inventive concept. FIG. 1B is a cross-sectional view taken along line I-I' of FIG. 1A for the pressure sensor according to the embodiment of the inventive concept. FIG. 1C is a cross-sectional view taken along line II-II' of FIG. 1A for the pressure sensor according to the embodiment of the inventive concept.

Referring to FIG. 1A, FIG. 1B, and FIG. 1C, an optical waveguide 110 may be disposed inside a lower substrate 100. The lower substrate 100 may include at least one of silicon, a silicon oxide layer, a silicon nitride layer, InP, or a polymer. The optical waveguide 110 may extend inside the lower substrate 100 in one direction. A top surface 111 of the optical waveguide 110 may be exposed from the lower substrate 100. For example, the top surface 111 of the optical waveguide 110 may be coplanar with a top surface of the lower substrate 100. A refractive index of the optical waveguide 110 is higher than a refractive index of the lower substrate 100. The optical waveguide 110 may include, for example, at least one of silicon, a silicon nitride, InP, or a polymer.

A graphene layer 120 may be disposed on the lower substrate 100. The graphene layer 120 may cover the top surface of the lower substrate 100 and the top surface 111 of the optical waveguide 110. The graphene layer 120 may be in direct contact with the top surface of the lower substrate 100 and the top surface 111 of the optical waveguide 110. The graphene layer 120 may include a single layer or a multi-layer of carbon atoms connected to each other by covalent bonds. The graphene layer 120 may have a thickness of about 0.7 nm. A protection film 130 may be disposed on the graphene layer 120. The protection film 130 may cover a top surface of the graphene layer 120. The protection film 130 may function to protect the graphene layer 120 so as to prevent structural deformation of the graphene layer 120. The protection film 130 may have, for example, a thickness of about 200 nm. The protection film 130 may include a polymeric material. The protection film 130 may include, for example, a polymethyl methacrylate (PMMA) film. The protection film 130 may be omitted unlike illustrated in the drawing.

An upper substrate 160 may be disposed above the protection film 130. The upper substrate 160 may be disposed spaced apart from a top surface of the protection film 130. A refractive index of the upper substrate 160 may not be limited to a refractive index of the optical waveguide 110. That is, the refractive index of the upper substrate 160 may be less than, greater than, or equal to the refractive index of the optical waveguide 110. The upper substrate 160 may be formed of a flexible material. The upper substrate 160 may include, for example, at least one of silicon, a silicon nitride layer, a silicon oxide layer, or InP.

Spacers 140 may be disposed between the protection film 130 and the upper substrate 160. The spacers 140 may extend in one direction between edge sections of the protection film 130 and edge sections of the upper spacer 160. The spacers 140 may be in contact with the top surface of the protection film 130 and a bottom surface of the upper substrate 160. The spacers 140 may be made of hard materials or flexible materials. The spacers 140 may include, for example, polydimethylsiloxane (PDMS). An air gap 150 may be defined between the protection film 130 and the upper substrate 160 by the spacers 140. The air gap 150 may be formed of air.

Figure 2A:
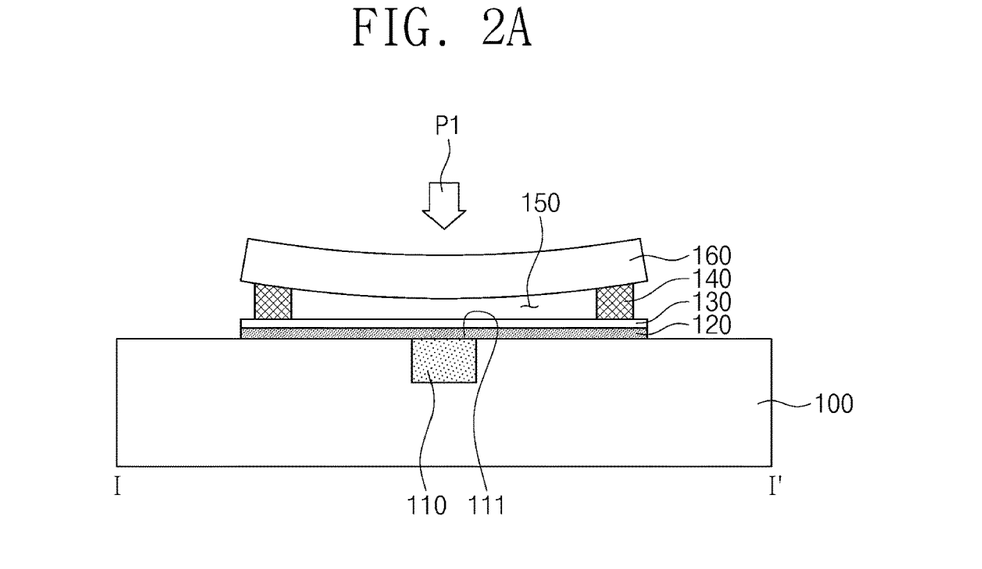
FIG. 2A and FIG. 3A are cross-sectional views taken along line I-I' of FIG. 1A, illustrating changes in the pressure sensor with respect to magnitudes of pressures according to the embodiment of the inventive concept.
Figure 2B:
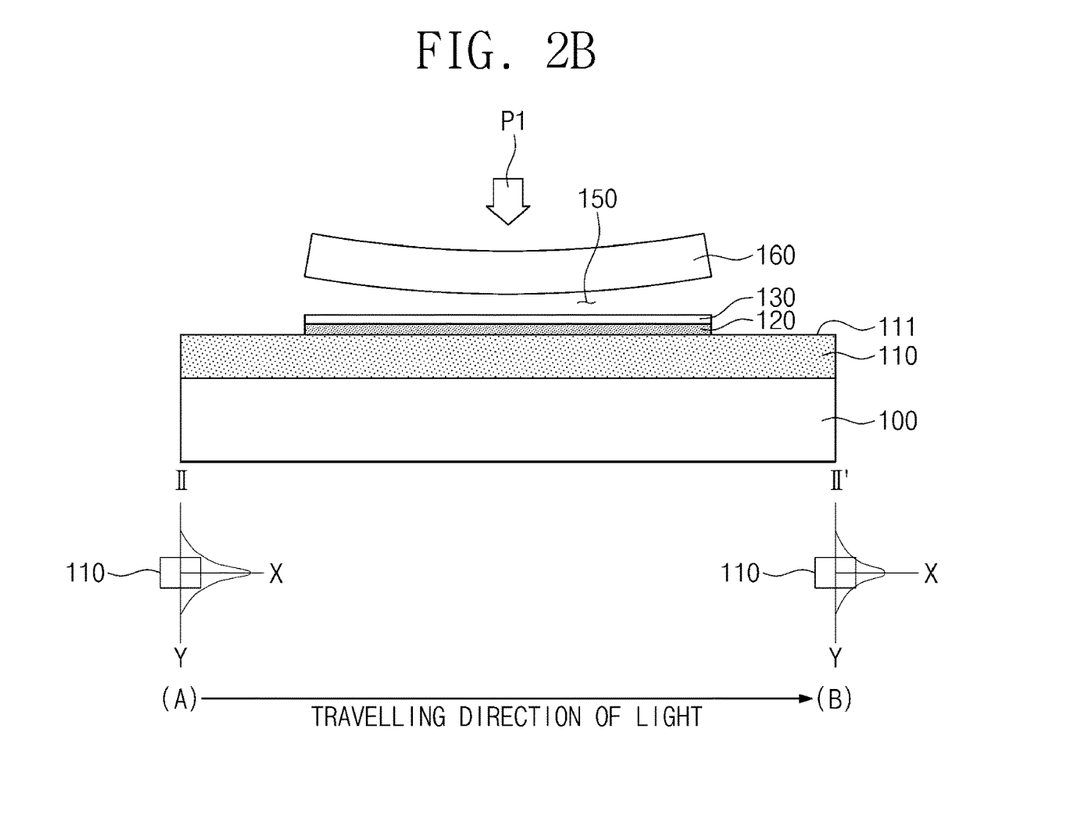
FIG. 2B and FIG. 3B are cross-sectional views taken along line II-II' of FIG. 1A, illustrating changes in the pressure sensor with respect to magnitudes of pressures according to the embodiment of the inventive concept.
Figure 3A:
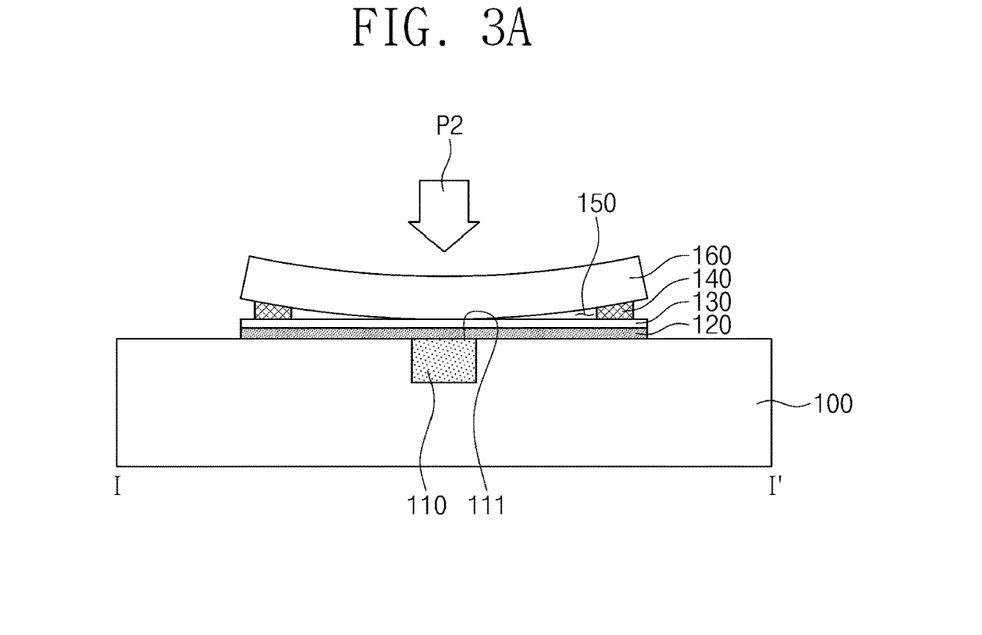
Figure 3B:
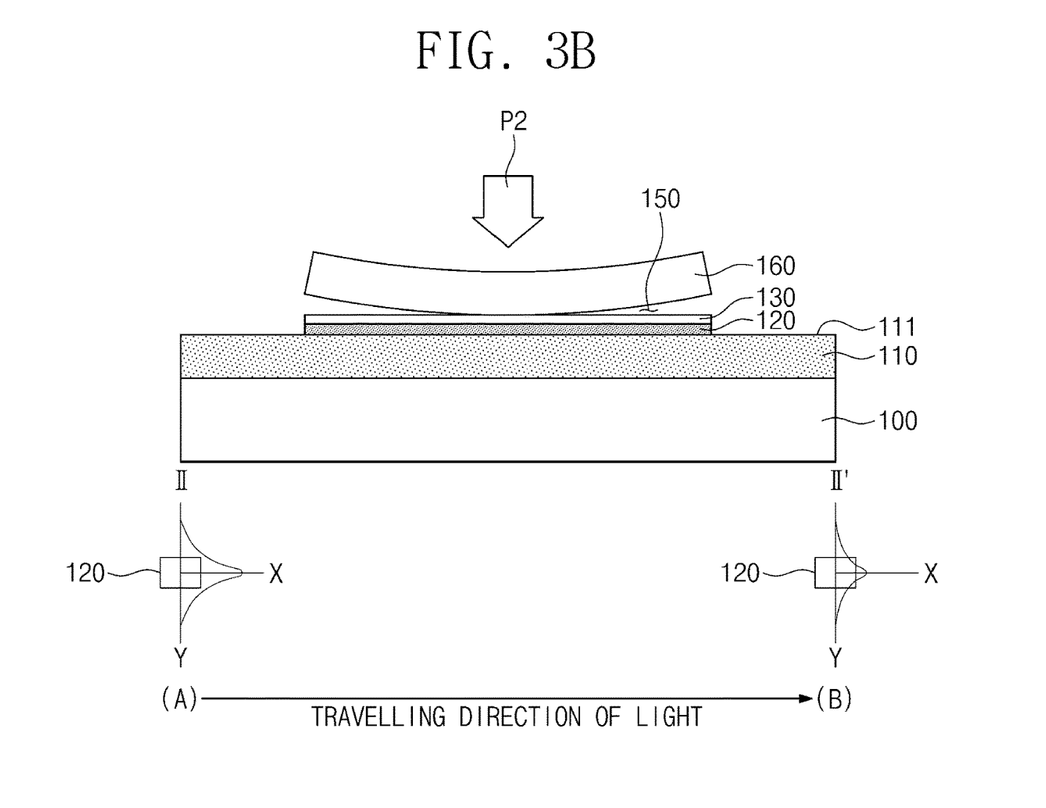

FIG. 2A and FIG. 3A are cross-sectional views taken along line I-I' of FIG. 1A, illustrating changes in the pressure sensor with respect to magnitudes of pressures according to the embodiment of the inventive concept. FIG. 2B and FIG. 3B are cross-sectional views taken along line II-II' of FIG. 1A, illustrating changes in the pressure sensor with respect to magnitudes of pressures according to the embodiment of the inventive concept.

(Operation Process of the Pressure Sensor)

Referring to FIG. 1C, FIG. 2A, FIG. 2B, FIG. 3A, and FIG. 3B, an optical signal travels from a light incident port A toward a light emission port B inside the optical waveguide 110. Graphs illustrated in the drawings show changes in the intensity of the optical signal as the optical signal travels from the light incident port A to the light emission part B, wherein an X axis represents intensity of an optical signal in the optical waveguide 110, and a Y axis represents intensity of an optical signal in the graphene layer 120. FIG. 1C shows a change in the intensity of the optical signal of the pressure sensor in a state in which a pressure is not applied, FIG. 2A and 2B show a change in the intensity of the optical signal of the pressure sensor in a state in which a first pressure P1 is applied, and FIG. 3A and FIG. 3B show a change in the intensity of the optical signal of the pressure sensor in a state in which a second pressure P2 is applied.

Referring to FIG. 1C, it may be found that there is no great difference between the intensity of the optical signal discharged from the light discharge port B and the intensity of the optical signal provided to the light incident port A. It may be found that the intensity of the optical signal inside the graphene layer 120 adjacent to the light emission port B is the same as the intensity of the optical signal inside the graphene layer 120 adjacent to the light incident port A. That it, it may be found that there is no difference between the intensity of the optical signal at the light incident port A and the intensity of the optical signal at the light emission part B, and thus it may be determined that a pressure is not applied to the pressure sensor.

Referring to FIG. 2A and FIG. 2B, when the first pressure P1 is applied to the upper substrate 160, an area of the air gap 150 may decrease, but contact areas of the spacers 140 in contact with the protection film 130 may increase. Interaction between the optical signal and the graphene layer 120 occurs due to the first pressure P1, and a portion of the optical signal traveling inside the optical waveguide 110 may be absorbed into the graphene layer 120. Accordingly, it may be found that the intensity of the optical signal at the light emission port B is lower than the intensity of the optical signal at the light incident port A. On the other hand, it may be found that the intensity of the optical signal inside the graphene layer 120 adjacent to the light emission port B is higher than the intensity of the optical signal inside the graphene layer 120 adjacent to the light incident port A. That is, it may be found that there is a change between the intensity of the optical signal inside the graphene layer 120 adjacent to the light incident port A and the intensity of the optical signal inside the graphene layer 120 adjacent to the light emission port B, and thus it may be determined that a pressure is applied to the pressure sensor.

Referring to FIG. 3A and FIG. 3B, when a second pressure P2 greater than the first pressure P1 is applied to the upper substrate 160, the air gap 150 may not be provided between the protection film 130 above the optical waveguide 110 and the upper substrate 160, and a portion of the upper substrate 160 overlapping the optical waveguide 110 may be in contact with the protection film 130. The contact areas of the spacers 140 in contact with the protection film 130 may be greater than those when the first pressure P1 is applied. A portion of the optical signal traveling inside the optical waveguide 110 may be absorbed into the graphene layer 120 due to the second pressure P2. Accordingly, it may be found that the intensity of the optical signal at the light emission port B is lower than the intensity of the optical signal at the light incident port A inside the optical waveguide 110. On the other hand, it may be found that the intensity of the optical signal inside the graphene layer 120 adjacent to the light emission port B is higher than the intensity of the optical signal inside the graphene layer 120 adjacent to the light incident port A.

In addition, the intensity of the optical signal discharged from the light emission port B at the second pressure P2 may be lower than the intensity of the optical signal discharged from the light emission port B at the first pressure P1. An amount of the optical signal absorbed into the graphene layer 120 at the second pressure P2 may be greater than an amount of the optical signal absorbed into the graphene layer 120 at the first pressure P1. Therefore, it may be determined that the second pressure P2 is a greater pressure than the first pressure p1.

According to the embodiment of the inventive concept, a pressure may be measured by disposing the graphene layer 120 between the optical waveguide 110 and the upper substrate 160 and using the characteristics that the optical signal traveling along the optical waveguide 110 is absorbed into the graphene layer 120 due to the pressure. Thus, the upper substrate 160 made of various materials, while not being limited to the refractive index of the optical waveguide 110, may be used.

Figure 4:
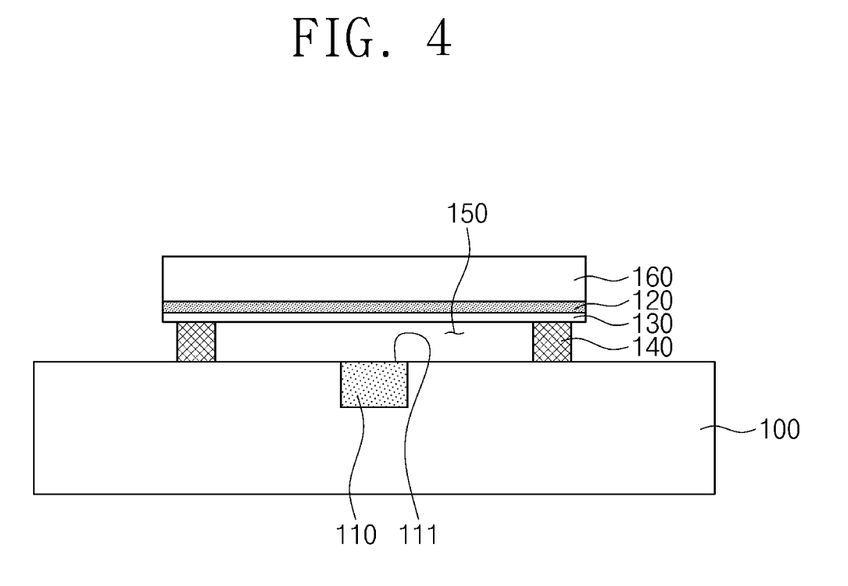
FIG. 4 is a cross-sectional view showing a pressure sensor according to an embodiment of the inventive concept.

FIG. 4 is a cross-sectional view showing a pressure sensor according to an embodiment of the inventive concept.

Referring to FIG. 4, the graphene layer 120 may be disposed on a bottom surface of the upper substrate 160. The graphene layer 120 may cover the bottom surface of the upper substrate 160. The protection film 130 may be disposed between the graphene layer 120 and the lower substrate 100. The protection film 130 may cover a second surface of the graphene layer 120, which is opposite to a first surface thereof in contact with the upper substrate 160. The protection film 130 may be spaced apart from the top surface of the lower substrate 100. The spacers 140 may be disposed between the lower substrate 100 and the protection film 130. The spacers 140 may be in contact with the top surface of the lower substrate 100 and a bottom surface of the protection film 130. The spacers 140 may be disposed on the bottom surface of edge sections of the protection film 130.

Figure 5A:
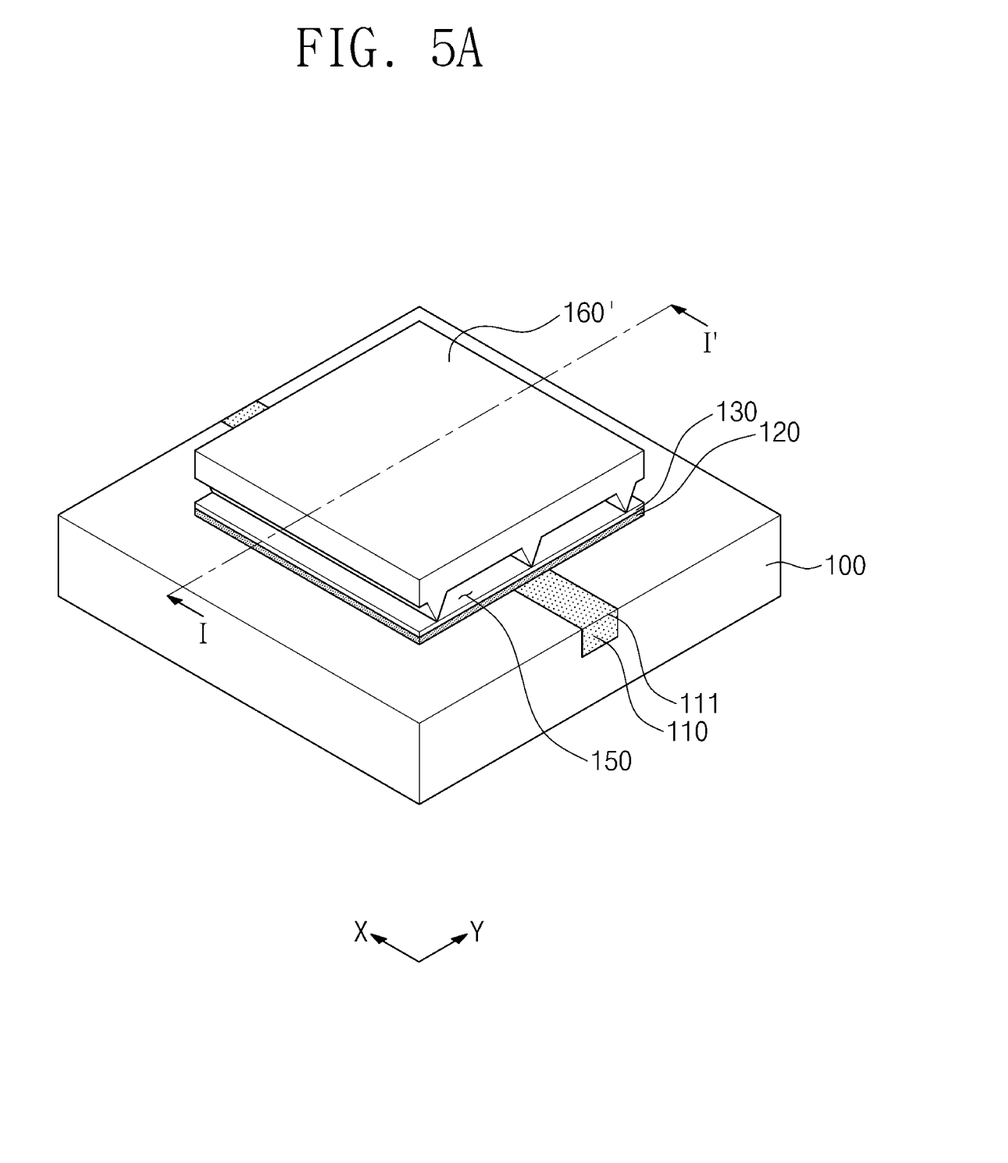
FIG. 5A is a perspective view of a pressure sensor according to an embodiment of the inventive concept.
Figure 5B:
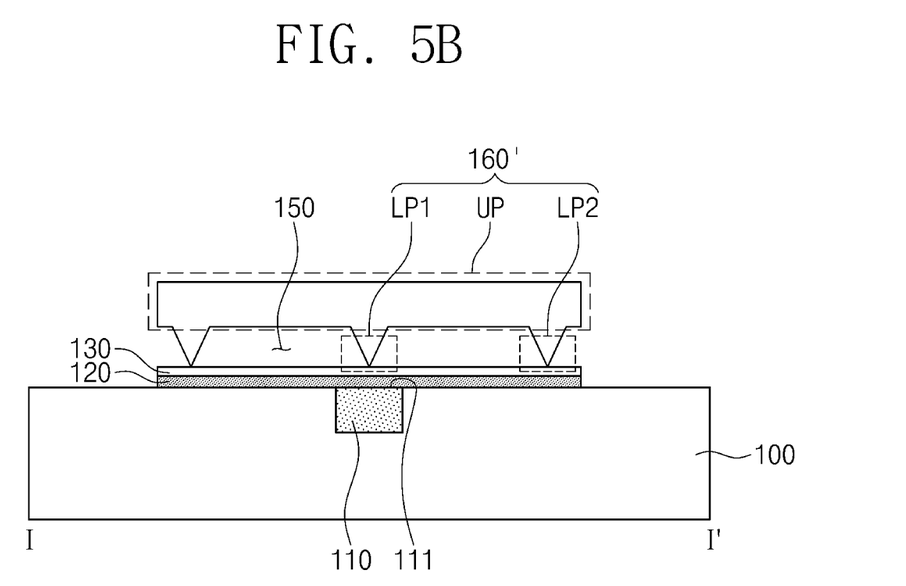
FIG. 5B is a cross-sectional view taken along line I-I' of FIG. 5A for the pressure sensor according to the embodiment of the inventive concept.

FIG. 5A is a perspective view of a pressure sensor according to an embodiment of the inventive concept. FIG. 5B is a cross-sectional view taken along line I-I' of FIG. 5A for the pressure sensor according to the embodiment of the inventive concept.

Referring to FIG. 5A and FIG. 5B, an upper substrate 160' may include lower portions LP1 and LP2 and an upper portion UP. The upper portion UP may be parallel to the top surface of the graphene layer 120. The lower portions LP1 and LP2 may protrude from a bottom surface of the upper portion UP toward the protection film 130. The lower portions LP1 and LP2 and the upper portion UP of the upper substrate 160' may be integrated with each other. Bottom surfaces of the lower portions LP1 and LP2 may be in contact with the protection film 130. The lower portions LP1 and LP2 of the upper substrate 160' may include a first lower portion LP1 and second lower portions LP2. The first lower portion LP1 may vertically overlap the optical waveguide 110, and the second lower portions LP2 may be disposed on both sides of the first lower portion LP1. The first and second lower portions LP2 may be in contact with the graphene layer 120. The lower portions LP1 and LP2 may have sharp ends. The lower portions LP1 and LP2 may have the same function as the spacers 140 illustrated in FIG. 1A and FIG. 1B. For one example, the lower portions LP1 and LP2 may have triangular shapes in cross-sections. The shapes of the lower portions LP are not limited thereto, and may have quadrangular or semicircular cross-sections.

Figure 6A:
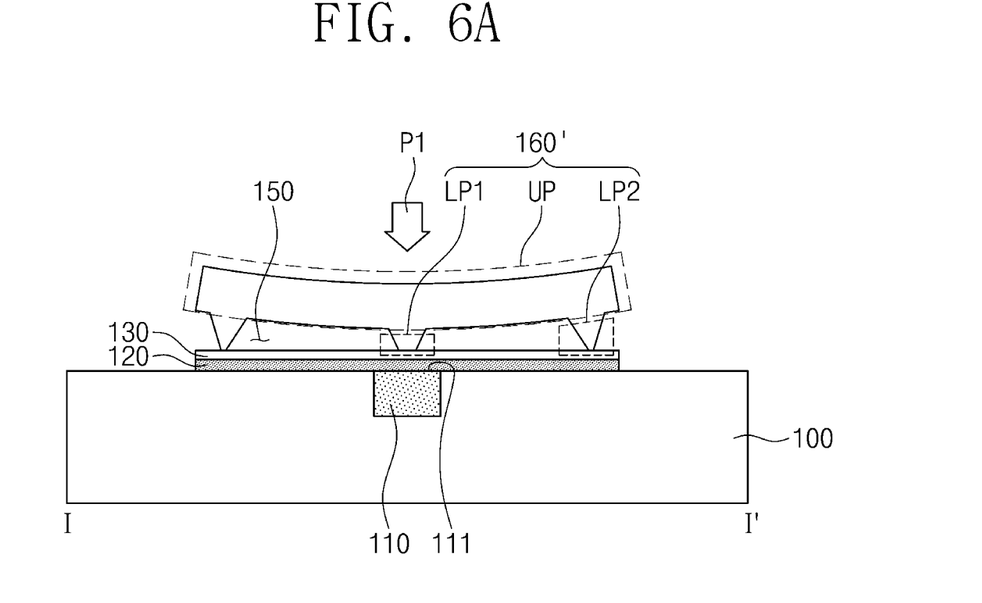
FIG. 6A and FIG. 6B are cross-sectional views taken along line I-I' of FIG. 5A, illustrating changes in the pressure sensor with respect to magnitudes of pressures according to the embodiment of the inventive concept.
Figure 6B:
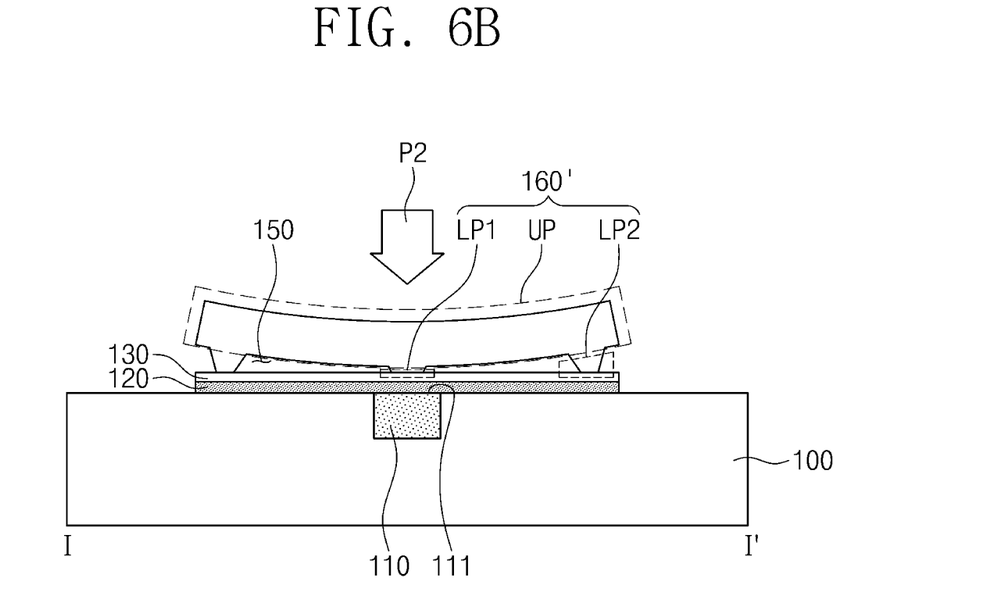

FIG. 6A and FIG. 6B are cross-sectional views taken along line I-I' of FIG. 5A, illustrating changes in the pressure sensor with respect to magnitudes of pressures according to the embodiment of the inventive concept.

Referring to FIG. 6A and FIG. 6B, a second pressure P2 illustrated in FIG. 6B may be greater than a first pressure P1 illustrated in FIG. 6A. Contact areas of the lower portions LP1 and LP2 in contact with the protection film 130 when the second pressure P2 is applied to the upper substrate 160' may be greater than contact areas thereof when the first pressure P1 is applied to the upper substrate 160'. In this case, as the magnitude of the pressure of the lower portions LP1 and LP2 applied to the protection film 130 increases, the magnitude of the pressure transmitted to the graphene layer 120 may increase together. Accordingly, an amount of the optical signal absorbed into the graphene layer 120 may increase.

According to the embodiment of the inventive concept, the pressure sensor may be provided, in which the first lower portion LP1 of the upper substrate 160' applies physical pressure to the graphene layer 120 disposed on the optical waveguide 110 and thus which detects the change in the intensity of the optical signal with respect to even a small change in pressure.

Figure 7A:
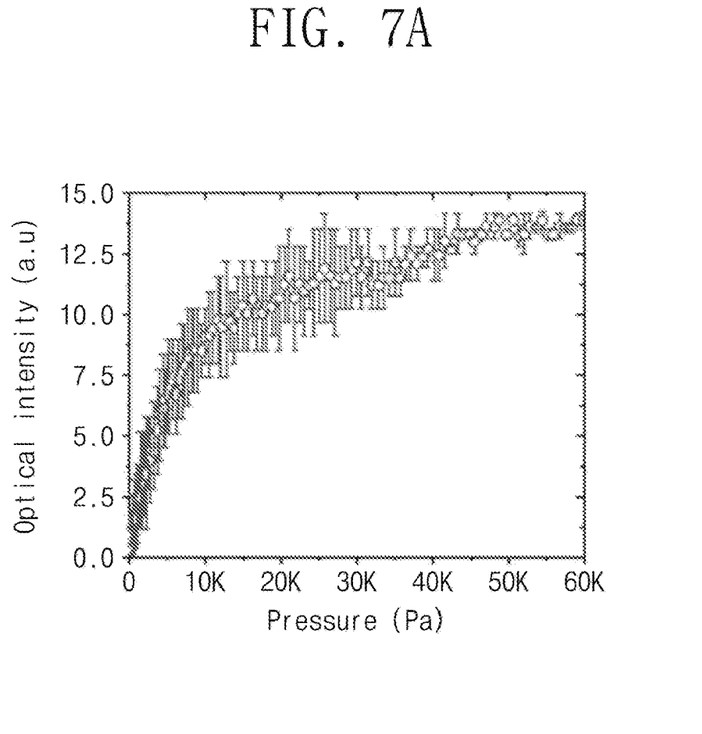
FIG. 7A is a graph showing a change in an optical signal inside a graphene layer due to a pressure according to an embodiment of the inventive concept.

FIG. 7A is a graph showing a change in an optical signal inside a graphene layer due to a pressure according to an embodiment of the inventive concept.

Referring to FIG. 7A, an X axis represents a pressure, and a Y axis represents an intensity of an optical signal of graphene. According to the embodiment of the inventive concept, it may be found that, as the pressure increases, the intensity of the optical signal inside the graphene layer 120 also increases.

Figure 7B:
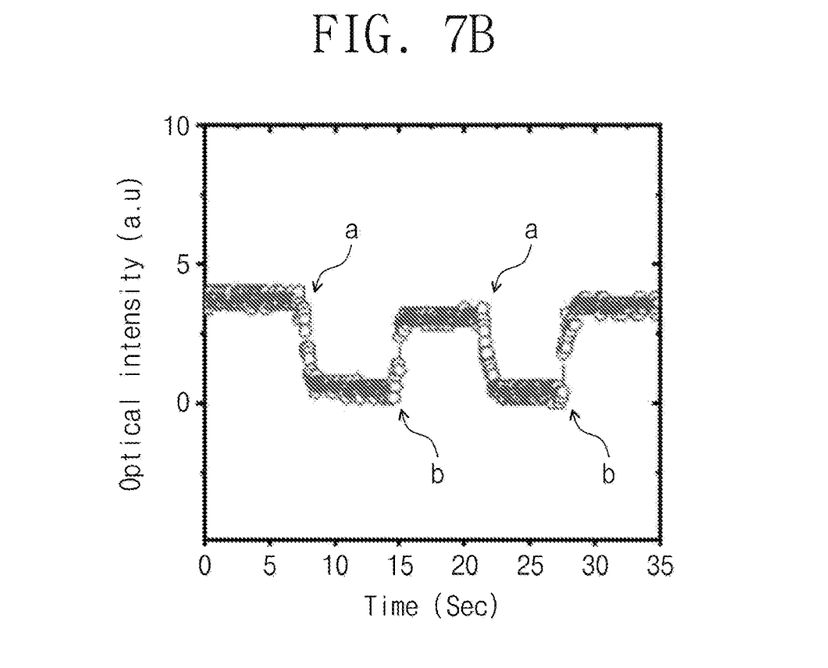
FIG. 7B and FIG. 7C are graphs showing changes in intensities of optical signals inside an optical waveguide over a time according to an embodiment of the inventive concept.
Figure 7C:
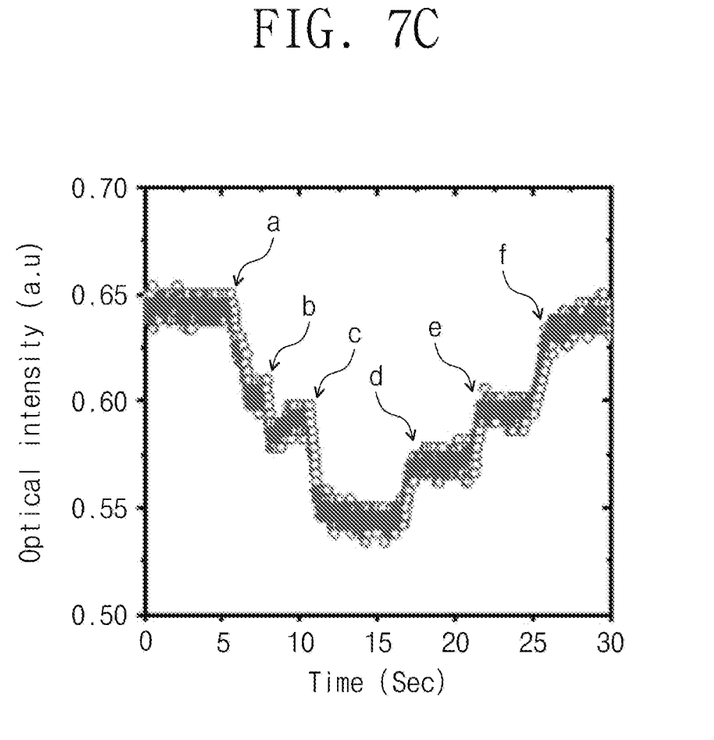

FIG. 7B and FIG. 7C are graphs showing changes in intensities of optical signals inside an optical waveguide over a time according to an embodiment of the inventive concept. An X axis represents a time, and a Y axis represents an intensity of an optical signal inside the optical waveguide.

Referring to FIG. 7B, a indicates a state in which a pressure is applied, but b indicates a state in which a pressure is not applied. It may be found that the intensity of the optical signal inside the optical waveguide decreases when the pressure is applied, but the intensity of the optical signal inside the optical waveguide increases when the pressure is not applied.

Referring to FIG. 7C, each of a, b, and c indicates the state in which the pressure is applied, but each of d, e, and f indicates the state in which the pressure is not applied. The pressure at b is higher than the pressure at a, and the pressure at c is higher than the pressure at b. The pressure at e is lower than the pressure at d, and the pressure at f is lower than the pressure at e. It may be found that the intensity of the optical signal inside the optical waveguide decreases gradually when the pressure increases gradually, and the intensity of the optical signal inside the optical waveguide increases gradually when the pressure decreases gradually.

Figure 8A:
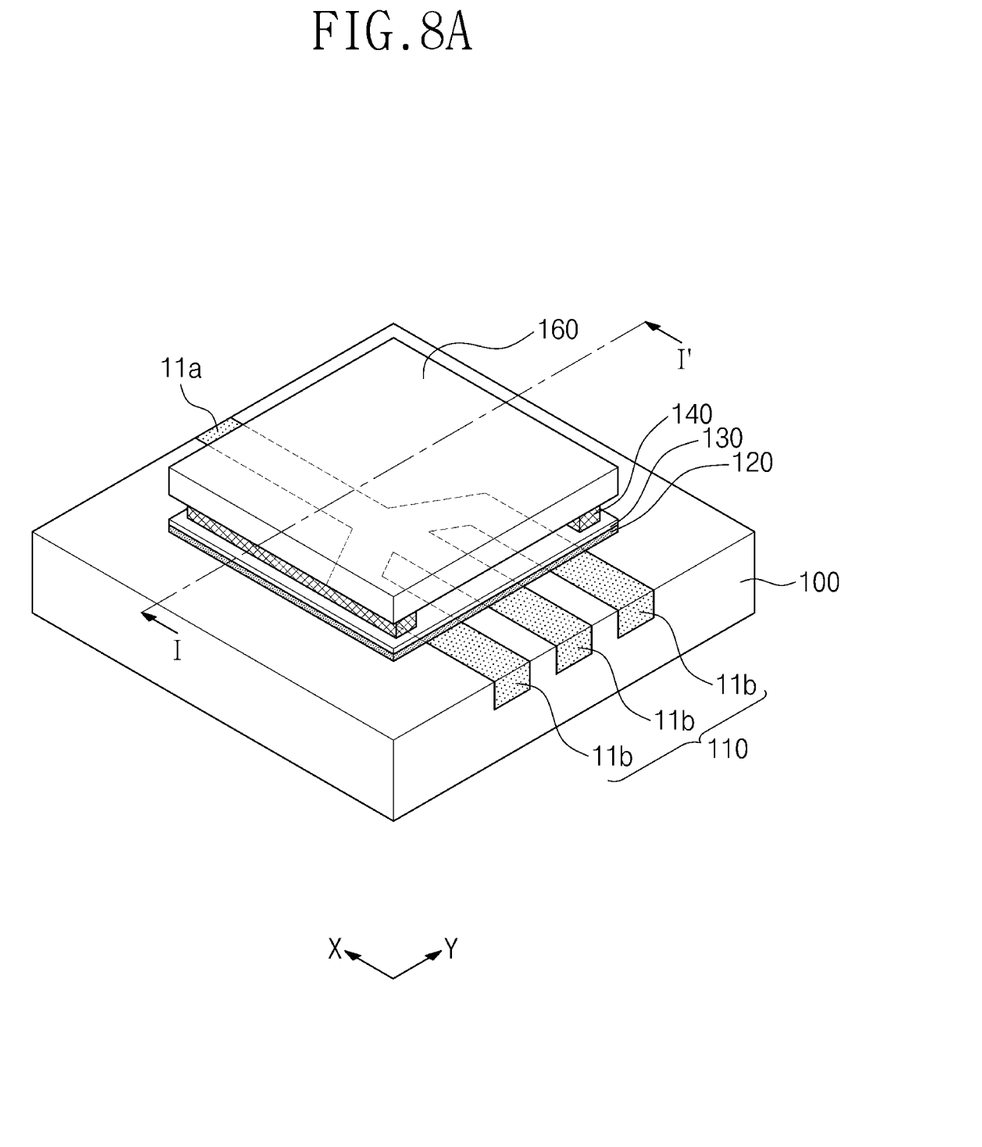
FIG. 8A is a perspective view of a pressure sensor according to an embodiment of the inventive concept.
Figure 8B:
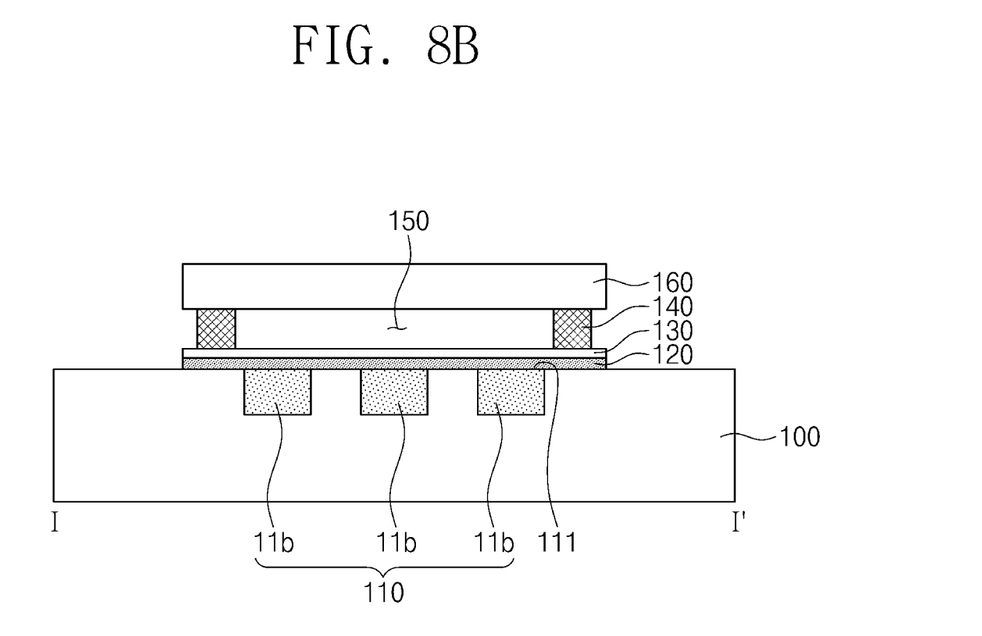
FIG. 8B is a cross-sectional view taken along line I-I' of FIG. 8A for the pressure sensor according to the embodiment of the inventive concept.

FIG. 8A is a perspective view of a pressure sensor according to an embodiment of the inventive concept. FIG. 8B is a cross-sectional view taken along line I-I' of FIG. 8A for the pressure sensor according to the embodiment of the inventive concept.

Referring to FIG. 8A and FIG. 8B, an optical waveguide 110 may include a single light incident channel 11*a* and a plurality of light emission channels 11*b*. The plurality of light emission channels 11*b* may be connected to one end of the light incident channel 11*a*, and the light incident channel 11*a* and the light emission channels 11*b* may be connected to each other. The light incident channel 11*a* and the light emission channels 11*b* may extend in a first direction X. The light emission channels 11*b* may be parallel to each other in the first direction X and arranged in a second direction Y crossing the first direction X. A graphene layer 120 may be disposed on the light emission channels 11*b*. According to the embodiment of the inventive concept, the plurality of light emission channels 11*b* may be provided so as to increase interaction strength between the optical signal and the graphene layer 120. Accordingly, the pressure sensor may be provided, which detects the change in the intensity of the optical signal with respect to even a small change in pressure.

Figure 9:
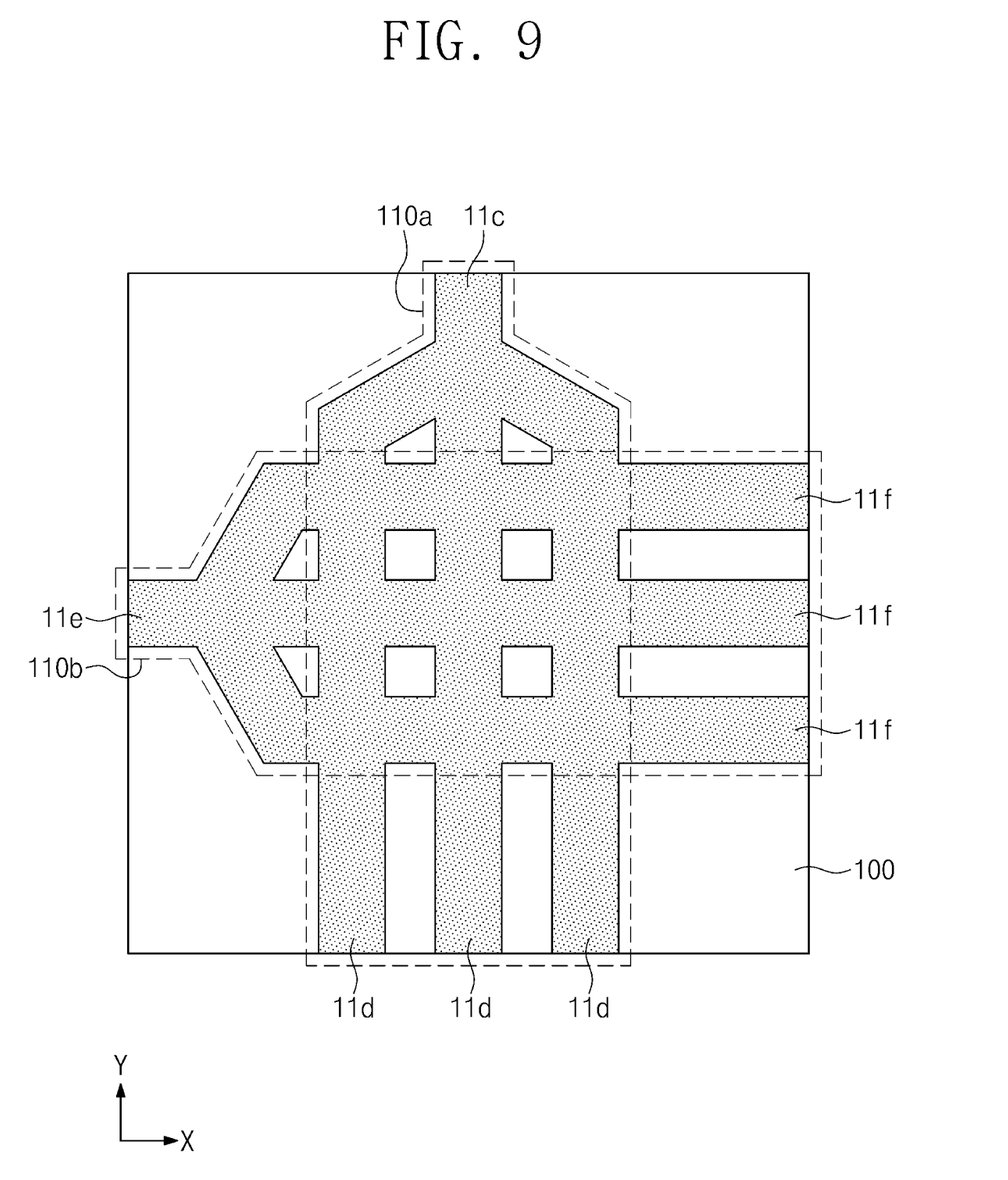
FIG. 9 is a plan view showing a lower substrate and an optical waveguide of a pressure sensor according to an embodiment of the inventive concept.

FIG. 9 is a plan view showing a lower substrate and an optical waveguide of a pressure sensor according to an embodiment of the inventive concept.

Referring to FIG. 9, a first optical waveguide 110a and a second optical waveguide 110b may be disposed inside a lower substrate 100. The first optical waveguide 110a may extend in a first direction X, and the second optical waveguide 110b may extend in a second direction Y. The first optical waveguide 110a and the second optical waveguide 110b may cross each other. The first optical waveguide 110a may include a single light incident channel 11c and a plurality of light emission channels 11d. The plurality of light emission channels 11d may be disposed at one end of the single light incident channel 11c. The plurality of light emission channels 11d and the single light incident channel 11c may be connected to each other. The plurality of light emission channels 11d may be parallel to each other in the first direction X.

The second optical waveguide 110b may include a single light incident channel 11e and a plurality of light emission channels 11f. The plurality of light emission channels 11f may be disposed at one end of the single light incident channel 11e. The plurality of light emission channels 11f and the single light incident channel 11e may be connected to each other. The plurality of light emission channels 11f may be parallel to each other in the second direction Y. The light emission channels 11d of the first optical waveguide 110a and the light emission channels 11f of the second optical waveguide 110b may cross each other. A first beam may flow in the second direction Y through the first optical waveguide 110a, and a second beam may flow in the first direction X through the second optical waveguide 110b.

According to the embodiment of the inventive concept, the plurality of optical waveguides are disposed to cross each other, and thus the locations of pressures and the magnitudes of pressures may be measured when pressures are present at several locations.

According to the embodiments of the inventive concept, the pressure may be measured by disposing the graphene layer between the optical waveguide and the upper substrate and using the characteristics that the optical signal traveling along the optical waveguide is absorbed into the graphene layer due to the pressure. Thus, the upper substrate made of various materials, while not being limited to the refractive index of the optical waveguide, may be used.

Although the embodiments of the inventive concept are described with reference to the accompanying drawings, those with ordinary skill in the technical field to which the inventive concept pertains will understand that the present disclosure can be carried out in other specific forms without changing the technical idea or essential features. Therefore, the above-described embodiments are to be considered in all aspects as illustrative and not restrictive.

What is claimed is:

1. A pressure sensor comprising:
a first optical waveguide inside a lower substrate;
a graphene layer on the lower substrate;
an upper substrate on the graphene layer;
spacers between the lower substrate and the upper substrate; and
an air gap defined by the spacers.

2. The pressure sensor of claim 1, wherein a top surface of the first optical waveguide is coplanar with a top surface of the lower substrate.

3. The pressure sensor of claim 1, wherein the graphene layer is in contact with the top surface of the lower substrate and the top surface of the first optical waveguide,
wherein the first optical waveguide transmits an optical signal therethrough, and
wherein the spacers deform to adjust a portion of the optical signal absorbed into the graphene layer in response to a pressure applied to the upper substrate.

4. The pressure sensor of claim 1, wherein a refractive index of the upper substrate is greater than or equal to a refractive index of the first optical waveguide.

5. The pressure sensor of claim 1, wherein a refractive index of the upper substrate is less than a refractive index of the first optical waveguide.

6. The pressure sensor of claim 1, further comprising a protection film configured to cover one surface of the graphene layer.

7. The pressure sensor of claim 6, wherein the protection film is disposed between the lower substrate and the graphene layer, and
the spacers are in contact with a top surface of the lower substrate and a bottom surface of the protection film.

8. The pressure sensor of claim 6, wherein the protection film is disposed between the graphene layer and the upper substrate, and
the spacers are in contact with a top surface of the protection film and a bottom surface of the upper substrate.

9. The pressure sensor of claim 1, wherein the spacers and the upper substrate are integrated with each other.

10. The pressure sensor of claim 1, wherein each of the spacers has a cross-section with a shape of a triangle, a quadrangle, or a semicircle.

11. The pressure sensor of claim 1,
wherein the air gap is provided between the graphene layer and the upper substrate.

12. The pressure sensor of claim 1,
wherein the air gap is provided between the graphene layer and the lower substrate.

13. The pressure sensor of claim 1, wherein the first optical waveguide comprises:
a light incident channel; and
a plurality of light emission channels disposed on one end of the light incident channel,
wherein the light emission channels are parallel to each other, and
the light incident channel and the light emission channels are connected to each other.

14. A pressure sensor comprising:
a first optical waveguide inside a lower substrate;
a graphene layer on the lower substrate;
an upper substrate on the graphene layer;
spacers between the lower substrate and the upper substrate; and
a second optical waveguide inside the lower substrate,
wherein the first optical waveguide extends in a first direction,
the second optical waveguide extends in a second direction crossing the first direction, and
the first optical waveguide and the second optical waveguide cross each other.

* * * * *